(12) United States Patent
Tohyama et al.

(10) Patent No.: US 7,763,121 B2
(45) Date of Patent: Jul. 27, 2010

(54) RUBBER PART HAVING AN ALUMINUM-BASED METAL COMPONENT AND METHOD OF PRODUCING THE SAME

(75) Inventors: Toyohisa Tohyama, Toyoake (JP); Takanori Sugiura, Nagoya (JP); Takehiko Taguchi, Nagoya (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 369 days.

(21) Appl. No.: 11/790,733

(22) Filed: Apr. 27, 2007

(65) Prior Publication Data

US 2007/0254123 A1    Nov. 1, 2007

(30) Foreign Application Priority Data

Apr. 28, 2006  (JP) .............................. 2006-126486
Apr. 17, 2007  (JP) .............................. 2007-108167

(51) Int. Cl.
*C23C 22/48* (2006.01)
*B22B 15/06* (2006.01)
*B22B 15/04* (2006.01)
*B22B 15/09* (2006.01)

(52) U.S. Cl. ...................... 148/270; 428/35.9; 428/457; 428/465

(58) Field of Classification Search ................. 148/270; 428/35.9, 465, 457
See application file for complete search history.

(56) References Cited

U.S. PATENT DOCUMENTS 5,700,334 A * 12/1997 Ishii et al. .................... 148/273
6,440,231 B1 * 8/2002 Beiersdorf et al. .......... 148/261
6,626,020 B2 * 9/2003 Kawada et al. ................. 72/67

FOREIGN PATENT DOCUMENTS

| DE | 508207 | 9/1930 |
| DE | 102007013404 A1 | 2/2008 |
| JP | 06-179978 A | 6/1994 |
| WO | 95/20061 A1 | 7/1995 |

OTHER PUBLICATIONS

German Office Action dated Aug. 14, 2008, issued in corresponding German10 Patent Application No. 10 2007 020 030.9-45.

* cited by examiner

*Primary Examiner*—Roy King
*Assistant Examiner*—Jessee R. Roe
(74) *Attorney, Agent, or Firm*—Westerman, Hattori, Daniels & Adrian, LLP

(57) ABSTRACT

A rubber part having an aluminum-based metal component including the metal component, a chemical film A formed on an outer peripheral surface of the metal component which is transformable following a squeezing of the metal component, an adhesive layer B formed on an outer peripheral surface of the chemical film A, and the rubber part formed on an outer peripheral surface of the adhesive layer B. The chemical film A includes zinc fluoride, molybdenum and aluminum fluoride, in which zinc of the zinc fluoride, the molybdenum and aluminum of the aluminum fluoride are present in a content ratio of zinc/molybdenum/aluminum=4.0 to 5.5/3.0 to 5.0/ 0.5 to 1.5 on a mass basis.

4 Claims, 1 Drawing Sheet

RUBBER PART HAVING AN ALUMINUM-BASED METAL COMPONENT AND METHOD OF PRODUCING THE SAME

BACKGROUND OF THE INVENTION

1. Field of the Invention

The present invention relates to a rubber part having an aluminum-based metal component such as a bushing and an engine mount for automobiles, and a vibration damping member for industrial machinery, and a method of producing the same.

2. Description of the Art

In recent years, a rubber part having an aluminum-based metal component, which is formed by integrating the metal component and the rubber part to be used as a connecting member between various components of a frame or an engine, has been used as bushings and engine mounts for automobiles, and vibration damping members for industrial machinery.

The rubber part having an aluminum-based metal component has a problem that corrosion on a surface of the metal component on an interface between the rubber part and the metal component causes separation therebetween, leading to a deterioration of the function of the rubber part having an aluminum-based metal component. For preventing the corrosion, the surface of the metal component is generally subjected to chromate treatment to form a chromate-based chemical film on the surface as disclosed in, for example, Japanese Unexamined Patent Publication No. 6-179978.

However, since crystallization water contained within the film structure of the chromate-based chemical film is easily dehydrated by heat generated during vulcanization of rubber, the film is vulnerable to cracks because of contraction of the film and to deterioration of adhesiveness. If a metal component under this condition is processed for diameter reduction or the like, the film may be unable to transform following the squeezing of the metal component, and cracks may be formed in the film, which leads to deterioration of adhesiveness between the metal component and the rubber part and insufficient protection of the metal component against corrosion.

In view of the foregoing, it is an object of the present invention to provide a rubber part having an aluminum-based metal component provided with a chemical film formed on the surface of the metal component, which is capable of transforming following the squeezing of the metal component, and a method of producing the same.

SUMMARY OF THE INVENTION

According to a first aspect of the present invention to achieve the aforesaid object, there is provided a rubber part having an aluminum-based metal component made of aluminum or an aluminum alloy, which is formed by integrating the metal component and the rubber part through a chemical film A formed on a surface of the metal component, and the chemical film A comprises zinc fluoride, molybdenum and aluminum fluoride, in which zinc of the zinc fluoride, the molybdenum and aluminum of the aluminum fluoride are present in the chemical film in a content ratio of zinc/molybdenum/aluminum=4.0 to 5.5/3.0 to 5.0/0.5 to 1.5 on a mass basis.

According to a second aspect of the present invention, there is provided a method of producing a rubber part having an aluminum-based metal component made of aluminum or an aluminum alloy, and comprising steps of forming a chemical film A on a surface of the metal component by bringing a treatment agent into contact with the surface; and integrating the metal component and the rubber part through the chemical film A, wherein the chemical film A comprises zinc fluoride, molybdenum and aluminum fluoride, zinc of the zinc fluoride, the molybdenum and aluminum of the aluminum fluoride being present in the chemical film in a content ratio of zinc/molybdenum/aluminum=4.0 to 5.5/3.0 to 5.0/0.5 to 1.5 on a mass basis, and the treatment agent comprises: (a) zinc sulfate aqueous solution containing 13 to 17% by weight of zinc sulfate heptahydrate; (b) ammonium fluoride aqueous solution containing 8 to 12% by weight of ammonium fluoride; and (c) sodium molybdate aqueous solution containing 3 to 7% by weight of sodium molybdate dihydrate, which are mixed in a mass ratio of (a)/(b)/(c)=5.25 to 8.75/2.25 to 3.75/1.50 to 2.50, the treatment agent containing 4.55 to 17.85 g/liter of zinc sulfate heptahydrate, 1.2 to 5.4 g/liter of ammonium fluoride and 0.3 to 2.1 g/liter of sodium molybdate dihydrate.

Inventors of the present invention conducted intensive studies for obtaining a chemical film formed on an aluminum-based metal component which is capable of transforming following the squeezing of the metal component in a diameter-reduction or the like. As a result of studies, the inventors have found that the chemical film A as described above is capable of transforming following the squeezing of the metal component in a diameter-reduction or the like and, further, providing excellent adhesion between a rubber part and an aluminum-based metal component formed with the film therebetween. Thus, the present invention has been achieved. The chemical film A is formed by bringing the above described treatment agent into contact with the surface of the aluminum-based metal component.

In the rubber part having an aluminum-based metal component according to the present invention, since the chemical film formed on the surface of the aluminum-based metal component has the above-mentioned composition of the chemical film A, the chemical film is capable of transforming following the squeezing of the metal component due to processing of the metal component for diameter reduction or the like. Further, the chemical film A provides excellent adhesion between the rubber part and the metal component. Since the squeeze of the metal component due to processing such as diameter reduction does not cause peeling-off or cracks in the chemical film A, an excellent anti-corrosion property is provided.

The chemical film A having a film mass within a range of 0.5 to 5.0 g/m$^2$ has further improved transformability in response to the squeezing of the aluminum-based metal component.

Further, the chemical film A having a thickness within a range of 0.5 to 5.5 μm has further improved transformability in response to the squeezing of the aluminum-based metal component.

According to the production method of a rubber part having an aluminum-based metal component of the present invention, the chemical film A is formed by bringing the treatment agent into contact with a surface of the metal component.

Further, where the treatment agent has a temperature of 50 to 60° C. and the surface of the aluminum-based metal component is kept in contact with the treatment agent for a period of 1 to 10 minutes, a chemical film A having a film mass within a range of 1 to 4 g/m$^2$ and a thickness within a range of 1 to 5 μm, which has an improved transformability in response to the squeezing of the aluminum-based metal component, is obtained.

DESCRIPTION OF THE PREFERRED EMBODIMENTS

Embodiments of the present invention will hereinafter be described in detail with reference to the attached drawings. It should be noted that the present invention is not limited to the embodiments.

Figure 1:
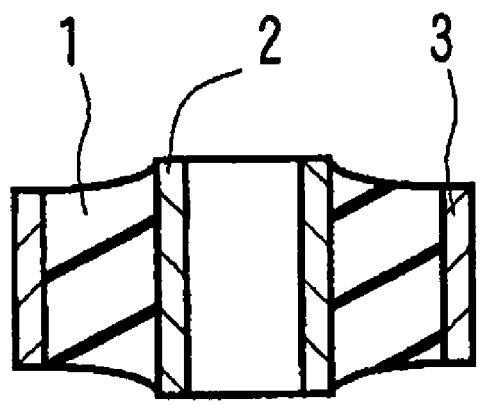
FIG. 1 is a vertical cross section of a cylindrical bushing formed as an embodiment of a rubber part having an aluminum-based metal component of the present invention.

FIG. 1 is a vertical cross section of a cylindrical bushing for automobiles illustrating an embodiment of a rubber part having an aluminum-based metal component of the present invention. According to this embodiment, the cylindrical bushing consists of a cylindrical vibration damping rubber 1 (rubber part), an inner sleeve 2 made of aluminum or an aluminum alloy (aluminum-based metal component) that is coaxially bonded to the vibration damping rubber 1 on an inner peripheral surface thereof, and an outer sleeve 3 made of aluminum or an aluminum alloy (aluminum-based metal component) that is coaxially bonded to the vibration damping rubber 1 on an outer peripheral surface thereof.

Figure 2:
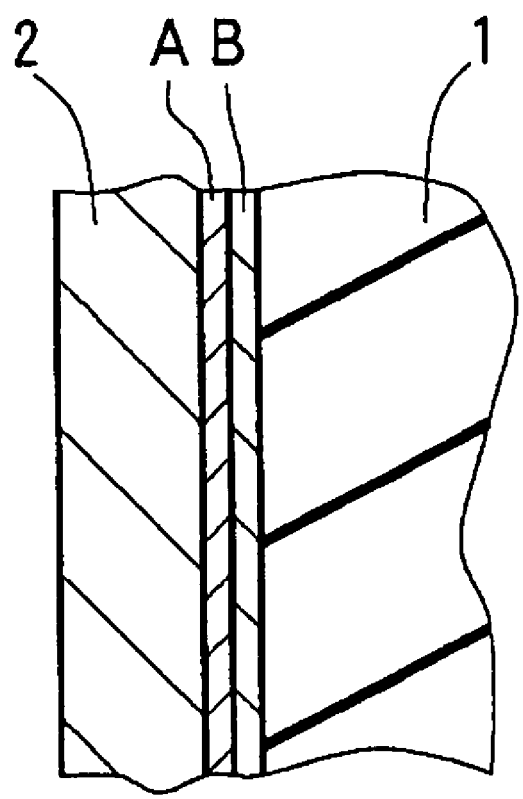
FIG. 2 is an enlarged cross sectional view showing a main portion of the cylindrical bushing in FIG. 1.

FIG. 2 is an enlarged cross section showing an interface between the inner sleeve 2 and the vibration damping rubber 1, in which a chemical film A (will be described in detail later) is formed on a whole outer peripheral surface of the inner sleeve 2, and an adhesive layer B is formed on an outer peripheral surface of the chemical film A, and the vibration damping rubber 1 is formed on an outer peripheral surface of the adhesive layer B. An interface between the outer sleeve 3 and the vibration damping rubber 1 has the same structure. An inventive feature of the present invention is the foregoing certain chemical film A provided on a surface of a metal component of a rubber part having an aluminum-based metal component such as a cylindrical bushing in an interface between the rubber part such as the vibration damping rubber 1 and the metal component such as the inner and outer sleeves 2, 3.

The chemical film A is formed by bringing a treatment agent, which will be described in detail later, into contact with a surface of the aluminum-based metal component made of aluminum or an aluminum alloy such as the inner and outer sleeves 2, 3.

The treatment agent contains 4.55 to 17.85 g/liter of zinc sulfate heptahydrate, 1.2 to 5.4 g/liter of ammonium fluoride and 0.3 to 2.1 g/liter of sodium molybdate dihydrate. The treatment agent is prepared, for example, in the following manner. The treatment agent is prepared by mixing 35.0 to 105.0 g of an aqueous solution (a) containing 13 to 17% by weight of zinc sulfate heptahydrate, 15.0 to 45.0 g of an aqueous solution (b) containing 8 to 12% by weight of ammonium fluoride and 10.0 to 30.0 g of an aqueous solution (c) containing 3 to 7% by weight of sodium molybdate in a mass ratio of (a)/(b)/(c)=5.25 to 8.75/2.25 to 3.75/1.50 to 2.50; and by diluting the mixture properly. For improving efficiency of formation of the chemical film A, the preferred amounts of the aqueous solutions (a) to (c) are 52.5 to 87.5 g, 22.5 to 37.5 g, and 15.0 to 25.0 g, respectively.

The chemical film A formed by using the above treatment agent comprises zinc fluoride, molybdenum and aluminum fluoride, in which zinc of the zinc fluoride, the molybdenum and aluminum of the aluminum fluoride (formed by a reaction of ammonium fluoride with aluminum in the aluminum-based metal component) are present in the chemical film in a content ratio of zinc/molybdenum/aluminum=4.0 to 5.5/3.0 to 5.0/0.5 to 1.5 on a mass basis. The composition (content ratio) of a chemical film is determined by ICP (Inductively Coupled Plasma) emission spectrometry.

The chemical film A having such a certain composition is amorphous. For improving the transformability of the chemical film A in response to the squeezing of the metal component, the chemical film A preferably has a film mass within a range of 0.5 to 5.0 g/m$^2$ and a thickness within a range of 0.5 to 5.5 μm. Where the film mass of the chemical film A is greater than 5.0 g/m$^2$ (upper limit of the above range) and the thickness of the chemical film A is thicker than 5.5 μm (upper limit of the above range), the above composition (content ratio) varies to a range of 6/3/1 to 7/2/1 (content ratio of zinc increases, while that of molybdenum decreases), and a crystalline film is formed, thereby deteriorating the transformability of the chemical film A.

For further improving transformability of the chemical film A in response to the squeezing of the inner and outer sleeves 2, 3, the chemical film A preferably has a film mass within a range of 1 to 4 g/m$^2$ and a thickness within a range of 1 to 5 μm.

For forming the chemical film A, the surface of the aluminum-based metal component (inner and outer sleeves 2, 3) is generally brought into contact with the treatment agent by immersing the metal component in the treatment agent. Alternatively, the treatment agent may be sprayed or applied onto the surface of the aluminum-based metal component. For forming a chemical film having further improved transformability in response to the squeezing of the metal component, that is, for forming a chemical film A having the film mass within the range of 1 to 4 g/m$^2$ and the thickness within the range of 1 to 5 μm, the treatment agent preferably has a temperature of 50 to 60° C. and the surface of the aluminum-based metal component is kept in contact with the treatment agent for a period of 1 to 10 minutes by immersion or the like.

Prior to the formation of the chemical film A (contact with the treatment agent), the following treatment may be performed if necessary: the aluminum-based metal components (inner and outer sleeves 2 and 3) are immersed in a heated alkali degreasing liquid for degreasing a whole surface of each sleeve; the degreased whole surfaces of the aluminum-based metal components (the inner and outer sleeves 2 and 3) are roughened by shot blasting treatment (average surface roughness at ten points (Rz) of approximately 10 μm to 30 μm); and the sleeves are degreased again in the same manner as above, and washed with water in a water-washing bath.

After a chemical film A is formed, the surfaces of the components are rinsed with water, rinsed with hot water and dried if necessary.

After the chemical film A is formed on the entire surfaces of the aluminum-based metal components (the inner and outer sleeves 2 and 3) as described above, the cylindrical bushing is produced, for example, by the following method: an adhesive is applied on each of an outer peripheral surface of the inner sleeve 2 and an inner peripheral surface of the outer sleeve 3 by spraying or the like for forming an adhesive layer B (having thickness of approximately 5 μm to 20 μm) on each of the surfaces; the inner and outer sleeves 2 and 3 are set in a mold to be coaxially aligned, and an unvulcanized rubber for forming the vibration damping rubber 1 is filled into a space enclosed by the inner and outer sleeves 2 and 3 and the mold, and vulcanized (at 140° C. to 200° C. for 5 to 60 minutes); and then, after being removed from the mold, the molded bushing is compressed from the outer peripheral surface of the outer sleeve 3 to reduce the diameter of the sleeve 3 (approximately 10% of the outer diameter of the sleeve 3). Thus, the cylindrical bushing is obtained.

In the thus obtained cylindrical bushing, the chemical film A is capable of transforming without causing any cracking or peeling-off following the squeezing of the outer sleeve 3 due to the diameter reduction process thereof. Accordingly, the cylindrical bushing is provided with a long-lasting adhesiveness between the vibration damping rubber 1 and each of the inner and outer sleeves 2 and 3, thereby providing the cylindrical bushing with long-lasting vibration damping function and an excellent anti-corrosion property.

Next, an explanation will be given to materials for forming the vibration damping rubber 1, the inner and outer sleeves 2 and 3, and materials for forming the adhesive layer B used in the foregoing production method.

Examples of materials for forming the vibration damping rubber 1 include natural rubber (NR), butadiene rubber (BR), styrene-butadiene rubber (SBR), isoprene rubber (IR), acrylonitrile-butadiene rubber (NBR), carboxyl-modified NBR, chloroprene rubber (CR), ethylene-propylene rubber (EPM, EPDM), maleic acid-modified EPM, butyl rubber (IIR), halogenated IIR, chlorosulfonated polyethylene (CSM), fluororubber (FKM), acrylic rubber, and epichlorohydrin rubber, which may be used alone or in combination. In addition to these materials, one or more reinforcing agents such as a carbon black, a vulcanizing agent, a vulcanization accelerator, a lubricant, an auxiliary agent, a plasticizer, an antioxidant and the like may be added, if necessary, depending on functions which the vibration damping rubber is required to have.

The inner and outer sleeves 2 and 3 are made of aluminum or an aluminum alloy that is not particularly limited, but examples of the materials include all aluminum-based metals, such as JIS (Japanese Industrial standards) A1000 to JIS A7000 aluminum or aluminum alloy, AC-based (aluminum casting) alloy, ADC-based (aluminum die-cast) alloy.

The adhesive layer B is formed of an adhesive that is not particularly limited, but generally formed of a commercially available adhesive such as CHEMLOK 205 and CHEMLOK 6108 (both available from LORD Corporation of North California, U.S.A.), which may be used alone or in combination.

The rubber part having an aluminum-based metal component according to the present invention is not limited to the foregoing cylindrical bushing for automobiles. The present invention is applicable to a variety of vibration damping parts such as a bushing having a shape other than a cylinder, an engine mount, a motor mount and the like to be used in automotive vehicles and other transport machines including aircraft; vehicles for industrial use such as a forklift, a wheeled tractor shovel, and a crawler crane; and railroad vehicles, as well as a variety of machines such as industrial machinery. Accordingly, the shape of the aluminum-based metal component is not limited to a cylinder, and may have other shapes such as a tabular shape or a corrugated shape. Where an aluminum-based metal component of the rubber part has any shape as exemplified above, the present invention generally consists of a rubber part disposed between upper and lower aluminum-based metal components in a sandwiching manner, or the present invention may consist of a rubber part provided with one aluminum-based metal component provided on either upper or lower side of the rubber part.

Next, Examples of the invention are described with reference to Comparative Examples. It should be noted that the present invention is not limited to the Examples.

EXAMPLE 1

[Aluminum-Based Metal Components]

A flat plate (25.4 mm×60 mm×3 mm (thickness)) made of JIS A6063 aluminum alloy was prepared.

[Treatment Agent for Forming Chemical Film]

A treatment agent for forming a chemical film was prepared by mixing 35.0 g of a zinc sulfate aqueous solution containing 13% by weight of zinc sulfate heptahydrate, 15.0 g of an ammonium fluoride aqueous solution containing 8% by weight of ammonium fluoride and 10.0 g of a sodium molybdate aqueous solution containing 3% by weight of sodium molybdate dihydrate, and diluting the resulting mixture so that zinc sulfate heptahydrate, ammonium fluoride and sodium molybdate dihydrate were present in concentrations of 4.55 g/liter, 1.2 g/liter and 0.3 g/liter, respectively, in the treatment agent.

[Chemical Film Formation]

The whole surface of the aluminum-based metal component (flat plate) was immersed in an alkali degreasing liquid heated to 60° C. for degreasing. The degreased whole surface of the metal component was roughened by shot blasting treatment (average surface roughness at ten points (Rz) of 20 μm). The metal component was degreased again in the same manner as above, and washed with water in a water-washing bath. Thus treated metal component was immersed in the above-mentioned treatment agent for forming chemical film (at 45° C. for 0.5 minutes) so as to form a chemical film. After being taken out of the treatment agent, the metal component was washed with water in the water-washing bath and dried (at 80° C. for 10 minutes). Thus obtained chemical film had a composition (content ratio) of Zn (zinc)/Mo (molybdenum)/Al (aluminum)=4.0/4.5/1.5 on a mass basis, a film mass of 0.5 g/m$^2$ and a thickness of 0.5 μm, and was white. The average surface roughness at ten points (Rz) was measured by means of a Surface Texture Measuring Instrument (SURFCOM1400D, product of Tokyo Seimitsu Co., Ltd. of Tokyo Japan). The composition (content ratio) of the chemical film was analyzed by ICP emission spectrometry (OPTIMA 4300DV, product of PerkinElmer Inc. of Massachusetts, U.S.A.). The film mass of the chemical film was obtained by immersing the aluminum-based metal component formed with the chemical film in a nitric acid solution of 10% for 5 minutes, measuring the mass of the aluminum-based metal component after the chemical film was peeled off, and comparing the mass of the metal component measured after the immersion and that of the metal component having the chemical film before the immersion. The thickness of the chemical film was measured by externally observing the film with an electronic microscope (SEME DX TypeN 3000). The color of the chemical film was determined by visually observing the film.

EXAMPLE 2

[Treatment Agent for Forming Chemical Film]

A treatment agent for forming a chemical film was prepared by mixing 52.5 g of a zinc sulfate aqueous solution containing 15% by weight of zinc sulfate heptahydrate, 22.5 g of an ammonium fluoride aqueous solution containing 10% by weight of ammonium fluoride and 25.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 7.88 g/liter, 2.25 g/liter and 1.25 g/liter, respectively, in the treatment agent.

[Chemical Film Formation]

A chemical film was formed in the same manner as Example 1, except that the aluminum-based metal component was immersed in the treatment agent for forming the chemical film of 50° C. for 1 minute. The obtained chemical film had a composition (content ratio) of Zn/Mo/Al=4.5/4.2/1.3 on a mass basis, a film mass of 1.0 g/m$^2$ and a thickness of 1.0 μm, and was light yellow.

EXAMPLE 3

[Treatment Agent for Forming Chemical Film]

A treatment agent for forming a chemical film was prepared by mixing 52.5 g of a zinc sulfate aqueous solution containing 15% by weight of zinc sulfate heptahydrate, 22.5 g of an ammonium fluoride aqueous solution containing 10% by weight of ammonium fluoride and 15.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 7.88 g/liter, 2.25 g/liter and 0.75 g/liter, respectively, in the treatment agent.

[Chemical Film Formation]

A chemical film was formed in the same manner as Example 1, except that the aluminum-based metal component was immersed in the treatment agent for forming the chemical film of 50° C. for 1 minute. The obtained chemical film had a composition (content ratio) of Zn/Mo/Al=4.4/5.0/0.6 on a mass basis, a film mass of 1.5 g/m$^2$ and a thickness of 1.5 μm, and was light yellow.

EXAMPLE 4

[Treatment Agent for Forming Chemical Film]

A treatment agent for forming a chemical film was prepared by mixing 70.0 g of a zinc sulfate aqueous solution containing 15% by weight of zinc sulfate heptahydrate, 30.0 g of an ammonium fluoride aqueous solution containing 10% by weight of ammonium fluoride and 20.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 10.5 g/liter, 3 g/liter and 1 g/liter, respectively, in the treatment agent.

[Chemical Film Formation]

A chemical film was formed in the same manner as Example 1, except that the aluminum-based metal component was immersed in the treatment agent for forming the chemical film of 55° C. for 5 minutes. The obtained chemical film had a composition (content ratio) of Zn/Mo/Al=4.4/4.9/0.7 on a mass basis, a film mass of 2.7 g/m$^2$ and a thickness of 2.8 μm, and was light yellow.

EXAMPLE 5

[Treatment Agent for Forming Chemical Film]

A treatment agent for forming a chemical film was prepared by mixing 87.5 g of a zinc sulfate aqueous solution containing 15% by weight of zinc sulfate heptahydrate, 37.5 g of an ammonium fluoride aqueous solution containing 10% by weight of ammonium fluoride and 25.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 13.13 g/liter, 3.75 g/liter and 1.25 g/liter, respectively, in the treatment agent.

[Chemical Film Formation]

A chemical film was formed in the same manner as Example 1, except that the aluminum-based metal component was immersed in the treatment agent for forming the chemical film of 60° C. for 5 minutes. The obtained chemical film had a composition (content ratio) of Zn/Mo/Al=4.5/4.2/1.3 on a mass basis, a film mass of 3.5 g/m$^2$ and a thickness of 3.5 μm, and was yellow.

EXAMPLE 6

[Treatment Agent for Forming Chemical Film]

A treatment agent for forming a chemical film was prepared by mixing 87.5 g of a zinc sulfate aqueous solution containing 15% by weight of zinc sulfate heptahydrate, 37.5 g of an ammonium fluoride aqueous solution containing 10% by weight of ammonium fluoride and 15.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 13.13 g/liter, 3.75 g/liter and 0.75 g/liter, respectively, in the treatment agent.

[Chemical Film Formation]

A chemical film was formed in the same manner as Example 1, except that the aluminum-based metal component was immersed in the treatment agent for forming the chemical film of 60° C. for 5 minutes. The obtained chemical film had a composition (content ratio) of Zn/Mo/Al=4.5/4.5/1.0 on a mass basis, a film mass of 4.0 g/m$^2$ and a thickness of 4.1 μm, and was brown.

EXAMPLE 7

[Treatment Agent for Forming Chemical Film]

A treatment agent for forming a chemical film was prepared by mixing 87.5 g of a zinc sulfate aqueous solution containing 15% by weight of zinc sulfate heptahydrate, 37.5 g of an ammonium fluoride aqueous solution containing 10% by weight of ammonium fluoride and 15.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 13.13 g/liter, 3.75 g/liter and 0.75 g/liter, respectively, in the treatment agent.

[Chemical Film Formation]

A chemical film was formed in the same manner as Example 1, except that the aluminum-based metal component was immersed in the treatment agent for forming the chemical film of 60° C. for 10 minutes. The obtained chemical film had a composition (content ratio) of Zn/Mo/Al=4.7/4.4/0.9 on a mass basis, a film mass of 5.0 g/m$^2$ and a thickness of 5.1 µm, and was brown.

EXAMPLE 8

[Treatment Agent for Forming Chemical Film]

A treatment agent for forming a chemical film was prepared by mixing 105.0 g of a zinc sulfate aqueous solution containing 17% by weight of zinc sulfate heptahydrate, 45.0 g of an ammonium fluoride aqueous solution containing 12% by weight of ammonium fluoride and 30.0 g of a sodium molybdate aqueous solution containing 7% by weight of sodium molybdate dihydrate, and diluting the resulting mixture so that zinc sulfate heptahydrate, ammonium fluoride and sodium molybdate dihydrate were present in concentrations of 17.85 g/liter, 5.4 g/liter and 2.1 g/liter, respectively, in the treatment agent.

[Chemical Film Formation]

A chemical film was formed in the same manner as Example 1, except that the aluminum-based metal component was immersed in the treatment agent for forming the chemical film of 60° C. for 5 minutes. The obtained chemical film had a composition (content ratio) of Zn/Mo/Al=4.8/4.3/0.9 on a mass basis, a film mass of 5.0 g/m$^2$ and a thickness of 5.1 µm, and was brown.

EXAMPLE 9

[Treatment Agent for Forming Chemical Film]

A treatment agent for forming a chemical film was prepared by mixing 70.0 g of a zinc sulfate aqueous solution containing 15% by weight of zinc sulfate heptahydrate, 30.0 g of an ammonium fluoride aqueous solution containing 10% by weight of ammonium fluoride and 25.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 10.5 g/liter, 3 g/liter and 1.25 g/liter, respectively, in the treatment agent.

[Chemical Film Formation]

A chemical film was formed in the same manner as Example 1, except that the aluminum-based metal component was immersed in the treatment agent for forming the chemical film of 45° C. for 10 minutes. The obtained chemical film had a composition (content ratio) of Zn/Mo/Al=4.0/4.9/1.1 on a mass basis, a film mass of 2.6 g/m$^2$ and a thickness of 2.6 µm, and was yellow.

EXAMPLE 10

[Treatment Agent for Forming Chemical Film]

A treatment agent for forming a chemical film was prepared by mixing 70.0 g of a zinc sulfate aqueous solution containing 15% by weight of zinc sulfate heptahydrate, 37.5 g of an ammonium fluoride aqueous solution containing 10% by weight of ammonium fluoride and 15.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 10.5 g/liter, 3.75 g/liter and 0.75 g/liter, respectively, in the treatment agent.

[Chemical Film Formation]

A chemical film was formed in the same manner as Example 1, except that the aluminum-based metal component was immersed in the treatment agent for forming the chemical film of 55° C. for 1 minute. The obtained chemical film had a composition (content ratio) of Zn/Mo/Al=5.5/3.3/1.2 on a mass basis, a film mass of 2.0 g/m$^2$ and a thickness of 2.0 µm, and was yellow.

EXAMPLE 11

[Treatment Agent for Forming Chemical Film]

A treatment agent for forming a chemical film was prepared by mixing 87.5 g of a zinc sulfate aqueous solution containing 15% by weight of zinc sulfate heptahydrate, 30.0 g of an ammonium fluoride aqueous solution containing 10% by weight of ammonium fluoride and 15.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 13.13 g/liter, 3 g/liter and 0.75 g/liter, respectively, in the treatment agent.

[Chemical Film Formation]

A chemical film was formed in the same manner as Example 1, except that the aluminum-based metal component was immersed in the treatment agent for forming the chemical film of 55° C. for 1 minute. The obtained chemical film had a composition (content ratio) of Zn/Mo/Al=5.4/3.0/1.6 on a mass basis, a film mass of 1.9 g/m$^2$ and a thickness of 1.9 µm, and was yellow.

EXAMPLE 12

[Treatment Agent for Forming Chemical Film]

A treatment agent for forming a chemical film was prepared by mixing 52.5 g of a zinc sulfate aqueous solution containing 15% by weight of zinc sulfate heptahydrate, 22.5 g of an ammonium fluoride aqueous solution containing 10% by weight of ammonium fluoride and 15.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 7.88 g/liter, 2.25 g/liter and 0.75 g/liter, respectively, in the treatment agent.

[Chemical Film Formation]

A chemical film was formed in the same manner as Example 1, except that the aluminum-based metal component was immersed in the treatment agent for forming the chemical film of 45° C. for 1 minute. The obtained chemical film had a composition (content ratio) of Zn/Mo/Al=4.5/5.0/0.5 on a mass basis, a film mass of 0.5 g/m$^2$ and a thickness of 0.5 µm, and was light yellow.

EXAMPLE 13

[Treatment Agent for Forming Chemical Film]

A treatment agent for forming a chemical film was prepared by mixing 87.5 g of a zinc sulfate aqueous solution containing 15% by weight of zinc sulfate heptahydrate, 37.5 g of an ammonium fluoride aqueous solution containing 10% by weight of ammonium fluoride and 20.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 13.13 g/liter, 3.75 g/liter and 1 g/liter, respectively, in the treatment agent.

[Chemical Film Formation]

A chemical film was formed in the same manner as Example 1, except that the aluminum-based metal component was immersed in the treatment agent for forming the chemical film of 45° C. for 1 minute. The obtained chemical film had a composition (content ratio) of Zn/Mo/Al=4.3/4.2/1.5 on a mass basis, a film mass of 0.9 g/m$^2$ and a thickness of 0.9 μm, and was light yellow.

COMPARATIVE EXAMPLE 1

[Treatment Agent for Forming Chemical Film]

A treatment agent for forming a chemical film was prepared by mixing 35.0 g of a zinc sulfate aqueous solution containing 15% by weight of zinc sulfate heptahydrate, 15.0 g of an ammonium fluoride aqueous solution containing 10% by weight of ammonium fluoride and 25.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 5.25 g/liter, 1.5 g/liter and 1.25 g/liter, respectively, in the treatment agent.

[Chemical Film Formation]

A chemical film was formed in the same manner as Example 1, except that the aluminum-based metal component was immersed in the treatment agent for forming the chemical film of 45° C. for 0.5 minutes. The obtained chemical film had a composition (content ratio) of Zn/Mo/Al=3.0/1.1/5.9 on a mass basis, a film mass of 0.3 g/m$^2$ and a thickness of 0.3 μm, and was white.

COMPARATIVE EXAMPLE 2

[Treatment Agent for Forming Chemical Film]

A treatment agent for forming a chemical film was prepared by mixing 175.0 g of a zinc sulfate aqueous solution containing 15% by weight of zinc sulfate heptahydrate, 30.0 g of an ammonium fluoride aqueous solution containing 10% by weight of ammonium fluoride and 10.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 26.25 g/liter, 3 g/liter and 0.5 g/liter, respectively, in the treatment agent.

[Chemical Film Formation]

A chemical film was formed in the same manner as Example 1, except that the aluminum-based metal component was immersed in the treatment agent for forming the chemical film of 55° C. for 5 minutes. The obtained chemical film had a composition (content ratio) of Zn/Mo/Al=6.0/3.0/1.0 on a mass basis, a film mass of 6.0 g/m$^2$ and a thickness of 6.1 μm, and was brown.

COMPARATIVE EXAMPLE 3

[Treatment Agent for Forming Chemical Film]

A treatment agent for forming a chemical film was prepared by mixing 70.0 g of a zinc sulfate aqueous solution containing 15% by weight of zinc sulfate heptahydrate, 60.0 g of an ammonium fluoride aqueous solution containing 10% by weight of ammonium fluoride and 20.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 10.5 g/liter, 6 g/liter and 1 g/liter, respectively, in the treatment agent.

[Chemical Film Formation]

A chemical film was formed in the same manner as Example 1, except that the aluminum-based metal component was immersed in the treatment agent for forming the chemical film of 55° C. for 5 minutes. The obtained chemical film had a composition (content ratio) of Zn/Mo/Al=7.7/1.5/0.8 on a mass basis, a film mass of 8.0 g/m$^2$ and a thickness of 8.2 μm, and was black.

COMPARATIVE EXAMPLE 4

[Treatment Agent for Forming Chemical Film]

A treatment agent for forming a chemical film was prepared by mixing 35.0 g of a zinc sulfate aqueous solution containing 15% by weight of zinc sulfate heptahydrate, 45.0 g of an ammonium fluoride aqueous solution containing 10% by weight of ammonium fluoride and 30.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 5.25 g/liter, 4.5 g/liter and 1.5 g/liter, respectively, in the treatment agent.

[Chemical Film Formation]

A chemical film was formed in the same manner as Example 1, except that the aluminum-based metal component was immersed in the treatment agent for forming the chemical film of 60° C. for 1 minute. The obtained chemical film had a composition (content ratio) of Zn/Mo/Al=3.8/5.5/0.7 on a mass basis, a film mass of 1.0 g/m$^2$ and a thickness of 1.0 μm, and was light yellow.

COMPARATIVE EXAMPLE 5

[Treatment Agent for Forming Chemical Film]

A treatment agent for forming a chemical film was prepared by mixing 70.0 g of a zinc sulfate aqueous solution containing 15% by weight of zinc sulfate heptahydrate, 90.0 g of an ammonium fluoride aqueous solution containing 10% by weight of ammonium fluoride and 10.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 10.5 g/liter, 9 g/liter and 0.5 g/liter, respectively, in the treatment agent.

[Chemical Film Formation]

A chemical film was formed in the same manner as Example 1, except that the aluminum-based metal component was immersed in the treatment agent for forming the chemical film of 55° C. for 5 minutes. The obtained chemical film had a composition (content ratio) of Zn/Mo/Al=8.2/1.5/0.3 on a mass basis, a film mass of 9.0 g/m$^2$ and a thickness of 9.2 μm, and was black.

COMPARATIVE EXAMPLE 6

[Treatment Agent for Forming Chemical Film]
A treatment agent for forming a chemical film was prepared by mixing 105.0 g of a zinc sulfate aqueous solution containing 15% by weight of zinc sulfate heptahydrate, 45.0 g of an ammonium fluoride aqueous solution containing 10% by weight of ammonium fluoride and 20.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 15.75 g/liter, 4.5 g/liter and 1 g/liter, respectively, in the treatment agent.

[Chemical Film Formation]
A chemical film was formed in the same manner as Example 1, except that the aluminum-based metal component was immersed in the treatment agent for forming the chemical film of 45° C. for 1 minutes. The obtained chemical film had a composition (content ratio) of Zn/Mo/Al=4.2/4.0/1.8 on a mass basis, a film mass of 1.5 g/m$^2$ and a thickness of 1.5 μm, and was light yellow.

COMPARATIVE EXAMPLE 7

[Treatment Agent for Forming Chemical Film]
A treatment agent for forming a chemical film was prepared by mixing 26.7 g of a zinc sulfate aqueous solution containing 15% by weight of zinc sulfate heptahydrate, 30.0 g of an ammonium fluoride aqueous solution containing 10% by weight of ammonium fluoride and 20.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 4 g/liter, 3 g/liter and 1 g/liter, respectively, in the treatment agent.

[Chemical Film Formation]
A chemical film was formed in the same manner as Example 1, except that the aluminum-based metal component was immersed in the treatment agent for forming the chemical film of 55° C. for 5 minutes. The obtained chemical film had a composition (content ratio) of Zn/Mo/Al=4.5/5.1/0.4 on a mass basis, a film mass of 3.2 g/m$^2$ and a thickness of 3.2 μm, and was brown.

COMPARATIVE EXAMPLE 8

[Treatment Agent for Forming Chemical Film]
A treatment agent for forming a chemical film was prepared by mixing 70.0 g of a zinc sulfate aqueous solution containing 15% by weight of zinc sulfate heptahydrate, 10.0 g of an ammonium fluoride aqueous solution containing 10% by weight of ammonium fluoride and 20.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 10.5 g/liter, 1 g/liter and 1 g/liter, respectively, in the treatment agent.

[Chemical Film Formation]
A chemical film was formed in the same manner as Example 1, except that the aluminum-based metal component was immersed in the treatment agent for forming the chemical film of 55° C. for 5 minutes. The obtained chemical film had a composition (content ratio) of Zn/Mo/Al=4.0/5.2/0.8 on a mass basis, a film mass of 1.5 g/m$^2$ and a thickness of 1.5 μm, and was white.

COMPARATIVE EXAMPLE 9

[Treatment Agent for Forming Chemical Film]
A treatment agent for forming a chemical film was prepared by mixing 70.0 g of a zinc sulfate aqueous solution containing 15% by weight of zinc sulfate heptahydrate, 30.0 g of an ammonium fluoride aqueous solution containing 10% by weight of ammonium fluoride and 2.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 10.5 g/liter, 3 g/liter and 0.1 g/liter, respectively, in the treatment agent.

[Chemical Film Formation]
A chemical film was formed in the same manner as Example 1, except that the aluminum-based metal component was immersed in the treatment agent for forming the chemical film of 55° C. for 5 minutes. The obtained chemical film had a composition (content ratio) of Zn/Mo/Al=6.0/3.0/1.0 on a mass basis, a film mass of 4.5 g/m$^2$ and a thickness of 4.5 μm, and was gray.

COMPARATIVE EXAMPLE 10

[Treatment for Forming Chemical Film]
A treatment agent for forming a chemical film was prepared by mixing 70.0 g of a zinc sulfate aqueous solution containing 15% by weight of zinc sulfate heptahydrate, 30.0 g of an ammonium fluoride aqueous solution containing 10% by weight of ammonium fluoride and 50.0 g of a sodium molybdate aqueous solution containing 5% by weight of sodium molybdate dihydrate, and diluting the resulting mixture so that zinc sulfate heptahydrate, ammonium fluoride and sodium molybdate dihydrate were present in concentrations of 10.5 g/liter, 3 g/liter and 2.5 g/liter, respectively, in the treatment agent.

[Chemical Film Formation]
A chemical film was formed in the same manner as Example 1, except that the aluminum-based metal component was immersed in the treatment agent for forming the chemical film of 55° C. for 5 minutes. The obtained chemical film had a composition (content ratio) of Zn/Mo/Al=3.5/5.5/1.0 on a mass basis, a film mass of 2.2 g/m$^2$ and a thickness of 2.2 μm, and was sunny yellow.

[Production of Test Sample]
One face of each of the flat-plate shaped aluminum-based metal components formed as Examples 1 to 13 and Comparative Examples 1 to 10 was masked except a center area (2.54 cm×2.54 cm) of the face. On the unmasked center area of the face, CHEMLOK 205, an adhesive available from LORD Corporation of North California, U.S.A., was applied by means of a spray, and further, CHEMLOK 6108, an adhesive available from LORD Corporation, was applied by means of a spray. The metal components were dried at 60° C. for 10 minutes and the masking on each face was removed, so that an adhesive layer (2.54 cm×2.54 cm×20 μm (thickness)) was formed. Then, each of the aluminum-based metal component was set in a mold, and unvulcanized rubber as described below was filled on the face having the adhesive layer of the metal component and press vulcanized (at 150° C. for 20 minutes). Thus, test samples were obtained, each comprising a plate-shaped rubber part having a thickness of 5 mm integrated with each of the plate-shaped aluminum-based metal components.

[Unvulcanized Rubber]

An unvulcanized rubber was prepared by blending 100 parts by weight of natural rubber, 35 parts by weight of HAF (High Abrasion Furnace) carbon black (SEAST 3, available from Tokai Carbon, Co., Ltd. of Tokyo, Japan), 5 parts by weight of zinc oxide (ZINC OXIDE I available from Sakai Chemical Industry Co., Ltd. of Osaka, Japan), 2 parts by weight of stearic acid (LUNAC S-30 available from Kao Corporation of Tokyo, Japan), 0.7 parts by weight of vulcanization accelerator (SOXINOL CZ available from Sumitomo Chemical Co., Ltd. of Osaka, Japan), and 2 parts by weight of sulfur (SULFAX 200S available from Tsurumi Chemical Co., Ltd. of Ibaraki, Japan), and then kneading the blend by means of a kneader and a mixing roll.

[Initial Adhesiveness]

Each of the thus obtained test samples of Examples 1 to 13 and Comparative Examples 1 to 10 was fixed to a tensile testing machine (product of ORIENTEC CO., LTD.) by pinching a distal end of each of the metal component and the rubber part of each sample with a chuck of the tensile testing machine. Then, 90° peeling tests were conducted at a pulling rate of 50 mm/minute. With the peeling tests, a load (N/2.54 cm: load per 2.54 cm (1 inch)) imposed on each test sample at the moment of rupture of the test sample was measured, and the ruptured surface of each test sample was visually observed. The results are shown in the following Tables 1 to 4. In the Tables 1 to 4, "R100", for example, means that 100% of the ruptured surface was formed in the rubber part, and "R95M5" means that 95% of the ruptured surface was formed in the rubber part and 5% of the ruptured surface was the interface between the rubber part and the aluminum-based metal component.

[Adhesiveness After Heating]

Each of the test samples was allowed to stand in an oven at 100° C. for 1000 hours, and the 90° peeling test was conducted on each sample in the same manner as above for measuring the load imposed on each sample at the moment of rupture and visually observing the ruptured surface thereof. The results of the tests are shown in the following Tables 1 to 4.

[Adhesiveness After Spraying Salt Water]

The rubber part of each test sample was pulled in a direction of separating from the aluminum-based metal component (flat plate) and extended by 25%. Under this condition, each of the samples was continuously sprayed with sodium chloride aqueous solution of concentration of 5% at a temperature of 35° C. for 1000 hours. Thereafter, the 90° peeling test was conducted on each sample in the same manner as above for measuring the load imposed on each sample at the moment of rupture and visually observing the ruptured surface thereof. The results of the tests are shown in the following Tables 1 to 4.

[Transformability of Chemical Film]

Each test sample was bent by 90° with the rubber part disposed on inner side thereof, and the rubber part was peeled off by a nipper for visually observing the ruptured surface thereof. The results of the tests are shown in the following Tables 1 to 4. In the evaluation of the ruptured portion of the test samples, a test sample in which a greater part of the rupture was formed in the rubber part is determined to have a chemical film having a superior adhesiveness and transformability following the squeezing of the metal component.

TABLE 1

| | EXAMPLE | | | | | |
|---|---|---|---|---|---|---|
| | 1 | 2 | 3 | 4 | 5 | 6 |
| Treatment agent | | | | | | |
| $ZnSO_4$ aqueous solution (g) | 35.0 | 52.5 | 52.5 | 70.0 | 87.5 | 87.5 |
| $ZnSO_4 \cdot 7H_2O$ (g/L) | 4.55 | 7.88 | 7.88 | 10.5 | 13.13 | 13.13 |
| $NH_4F$ aqueous solution (g) | 15.0 | 22.5 | 22.5 | 30.0 | 37.5 | 37.5 |
| $NH_4F$ (g/L) | 1.2 | 2.25 | 2.25 | 3 | 3.75 | 3.75 |
| $Na_2MoO_4$ aqueous solution (g) | 10.0 | 25.0 | 15.0 | 20.0 | 25.0 | 15.0 |
| $Na_2MoO_4 \cdot 2H_2O$ (g/L) | 0.3 | 1.25 | 0.75 | 1 | 1.25 | 0.75 |
| Temperature (° C.) | 45 | 50 | 50 | 55 | 60 | 60 |
| Immersion period (min) | 0.5 | 1 | 1 | 5 | 5 | 5 |
| Chemical Film | | | | | | |
| Film mass (g/m$^2$) | 0.5 | 1.0 | 1.5 | 2.7 | 3.5 | 4.0 |
| Thickness (μm) | 0.5 | 1.0 | 1.5 | 2.8 | 3.5 | 4.1 |
| Content ratio | | | | | | |
| Zn | 4.0 | 4.5 | 4.4 | 4.4 | 4.5 | 4.5 |
| Mo | 4.5 | 4.2 | 5.0 | 4.9 | 4.2 | 4.5 |
| Al | 1.5 | 1.3 | 0.6 | 0.7 | 1.3 | 1.0 |
| Color | White | Light Yellow | Light Yellow | Light Yellow | Yellow | Brown |
| Adhesiveness | | | | | | |
| Initial Adhesiveness | | | | | | |
| Load (N/2.54 cm) | 400 | 400 | 410 | 420 | 410 | 410 |
| Ruptured surface | R100 | R100 | R100 | R100 | R100 | R100 |

TABLE 1-continued

|  | EXAMPLE | | | | | |
|---|---|---|---|---|---|---|
|  | 1 | 2 | 3 | 4 | 5 | 6 |
| Adhesiveness After Heating | | | | | | |
| Load (N/2.54 cm) | 100 | 100 | 120 | 120 | 110 | 110 |
| Ruptured surface | R100 | R100 | R100 | R100 | R100 | R100 |
| Adhesiveness After Spraying Salt Water | | | | | | |
| Load (N/2.54 cm) | 360 | 360 | 380 | 400 | 380 | 380 |
| Ruptured surface | R100 | R100 | R100 | R100 | R100 | R100 |
| Transformability | R100 | R100 | R100 | R100 | R100 | R100 |

TABLE 2

|  | EXAMPLE | | | | | | |
|---|---|---|---|---|---|---|---|
|  | 7 | 8 | 9 | 10 | 11 | 12 | 13 |
| Treatment agent | | | | | | | |
| ZnSO$_4$ aqueous solution (g) | 87.5 | 105.0 | 70.0 | 70.0 | 87.5 | 52.5 | 87.5 |
| ZnSO$_4$•7H$_2$O (g/L) | 13.13 | 17.85 | 10.5 | 10.5 | 13.13 | 7.88 | 13.13 |
| NH$_4$F aqueous solution (g) | 37.5 | 45.0 | 30.0 | 37.5 | 30.0 | 22.5 | 37.5 |
| NH$_4$F (g/L) | 3.75 | 5.4 | 3 | 3.75 | 3 | 2.25 | 3.75 |
| Na$_2$MoO$_4$ aqueous solution (g) | 15.0 | 30.0 | 25.0 | 15.0 | 15.0 | 15.0 | 20.0 |
| Na$_2$MoO$_4$•2H$_2$O (g/L) | 0.75 | 2.1 | 1.25 | 0.75 | 0.75 | 0.75 | 1 |
| Temperature (° C.) | 60 | 60 | 45 | 55 | 55 | 45 | 45 |
| Immersion period (min) | 10 | 5 | 10 | 1 | 1 | 1 | 1 |
| Chemical Film | | | | | | | |
| Film mass (g/m$^2$) | 5.0 | 5.0 | 2.6 | 2.0 | 1.9 | 0.5 | 0.9 |
| Thickness (μm) | 5.1 | 5.1 | 2.6 | 2.0 | 1.9 | 0.5 | 0.9 |
| Content ratio | | | | | | | |
| Zn | 4.7 | 4.8 | 4.0 | 5.5 | 5.4 | 4.5 | 4.3 |
| Mo | 4.4 | 4.3 | 4.9 | 3.3 | 3.0 | 5.0 | 4.2 |
| Al | 0.9 | 0.9 | 1.1 | 1.2 | 1.6 | 0.5 | 1.5 |
| Color | Brown | Brown | Yellow | Yellow | Yellow | Light Yellow | Light Yellow |
| Adhesiveness Initial Adhesiveness | | | | | | | |
| Load (N/2.54 cm) | 400 | 400 | 400 | 420 | 420 | 410 | 410 |
| Ruptured surface | R100 | R100 | R100 | R100 | R100 | R100 | R100 |
| Adhesiveness After Heating | | | | | | | |
| Load (N/2.54 cm) | 100 | 100 | 100 | 110 | 110 | 120 | 120 |
| Ruptured surface | R100 | R100 | R100 | R100 | R100 | R100 | R100 |
| Adhesiveness After Spraying Salt Water | | | | | | | |
| Load (N/2.54 cm) | 380 | 380 | 360 | 400 | 400 | 380 | 380 |
| Ruptured surface | R100 | R100 | R100 | R100 | R100 | R100 | R100 |
| Transformability | R100 | R100 | R100 | R100 | R100 | R100 | R100 |

TABLE 3

|  | COMPARATIVE EXAMPLE | | | | | |
|---|---|---|---|---|---|---|
|  | 1 | 2 | 3 | 4 | 5 | 6 |
| Treatment agent | | | | | | |
| ZnSO$_4$ aqueous solution (g) | 35.0 | 175.0 | 70.0 | 35.0 | 70.0 | 105.0 |
| ZnSO$_4$•7H$_2$O (g/L) | 5.25 | 26.25 | 10.5 | 5.25 | 10.5 | 15.75 |
| NH$_4$F aqueous solution (g) | 15.0 | 30.0 | 60.0 | 45.0 | 90.0 | 45.0 |
| NH$_4$F (g/L) | 1.5 | 3 | 6 | 4.5 | 9 | 4.5 |
| Na$_2$MoO$_4$ aqueous solution (g) | 25.0 | 10.0 | 20.0 | 30.0 | 10.0 | 20.0 |
| Na$_2$MoO$_4$•2H$_2$O (g/L) | 1.25 | 0.5 | 1 | 1.5 | 0.5 | 1 |
| Temperature (° C.) | 45 | 55 | 55 | 60 | 55 | 45 |
| Immersion period (min) | 0.5 | 5 | 5 | 1 | 5 | 1 |

TABLE 3-continued

| | COMPARATIVE EXAMPLE | | | | | |
|---|---|---|---|---|---|---|
| | 1 | 2 | 3 | 4 | 5 | 6 |
| Chemical Film | | | | | | |
| Film mass (g/m$^2$) | 0.3 | 6.0 | 8.0 | 1.0 | 9.0 | 1.5 |
| Thickness (μm) | 0.3 | 6.1 | 8.2 | 1.0 | 9.2 | 1.5 |
| Content ratio | | | | | | |
| Zn | 3.0 | 6.0 | 7.7 | 3.8 | 8.2 | 4.2 |
| Mo | 1.1 | 3.0 | 1.5 | 5.5 | 1.5 | 4.0 |
| Al | 5.9 | 1.0 | 0.8 | 0.7 | 0.3 | 1.8 |
| Color | White | Brown | Black | Light Yellow | Black | Light Yellow |
| Adhesiveness Initial Adhesiveness | | | | | | |
| Load (N/2.54 cm) | 400 | 400 | 360 | 410 | 320 | 420 |
| Ruptured surface | R100 | R100 | R95M5 | R100 | R90M10 | R100 |
| Adhesiveness After Heating | | | | | | |
| Load (N/2.54 cm) | 100 | 100 | 100 | 120 | 100 | 120 |
| Ruptured surface | R100 | R100 | R100 | R100 | R100 | R100 |
| Adhesiveness After Spraying Salt Water | | | | | | |
| Load (N/2.54 cm) | 360 | 380 | 240 | 380 | 240 | 400 |
| Ruptured surface | R95M5 | R100 | R90M10 | R97M3 | R85M15 | R97M3 |
| Transformability | R100 | R95M5 | R90M10 | R100 | R85M15 | R100 |

TABLE 4

| | COMPARATIVE EXAMPLE | | | |
|---|---|---|---|---|
| | 7 | 8 | 9 | 10 |
| Treatment agent | | | | |
| ZnSO$_4$ aqueous solution (g) | 26.7 | 70.0 | 70.0 | 70.0 |
| ZnSO$_4$·7H$_2$O (g/L) | 4 | 10.5 | 10.5 | 10.5 |
| NH$_4$F aqueous solution (g) | 30.0 | 10.0 | 30.0 | 30.0 |
| NH$_4$F (g/L) | 3 | 1 | 3 | 3 |
| Na$_2$MoO$_4$ aqueous solution (g) | 20.0 | 20.0 | 2.0 | 50.0 |
| Na$_2$MoO$_4$·2H$_2$O (g/L) | 1 | 1 | 0.1 | 2.5 |
| Temperature (° C.) | 55 | 55 | 55 | 55 |
| Immersion period (min) | 5 | 5 | 5 | 5 |
| Chemical Film | | | | |
| Film mass (g/m$^2$) | 3.2 | 1.5 | 4.5 | 2.2 |
| Thickness (μm) | 3.2 | 1.5 | 4.5 | 2.2 |
| Content ratio | | | | |
| Zn | 4.5 | 4.0 | 6.0 | 3.5 |
| Mo | 5.1 | 5.2 | 3.0 | 5.5 |
| Al | 0.4 | 0.8 | 1.0 | 1.0 |
| Color | Brown | White | Gray | Sunny Yellow |
| Adhesiveness Initial Adhesiveness | | | | |
| Load (N/2.54 cm) | 360 | 400 | 340 | 340 |
| Ruptured surface | R100 | R100 | R100 | R100 |
| Adhesiveness After Heating | | | | |
| Load (N/2.54 cm) | 100 | 100 | 100 | 120 |
| Ruptured surface | R100 | R100 | R100 | R100 |
| Adhesiveness After Spraying Salt Water | | | | |
| Load (N/2.54 cm) | 360 | 320 | 260 | 320 |
| Ruptured surface | R95M5 | R90M10 | R80M20 | R95M5 |
| Transformability | R100 | R100 | R100 | R100 |

As can be understood from the results shown in Tables 1 to 4, Examples 1 to 13 were all ruptured in the rubber parts, showing that a rubber part having an aluminum-based metal component according to each of these Examples is excellent in adhesiveness between the rubber part and the metal component, and has a chemical film having an excellent transformability. Particularly, the excellent adhesiveness of the test samples in a corrosive condition (after spraying of salt water) shows that the surface of the aluminum-based metal component integrated with the rubber part is not corroded. In contrast, the results in Tables show that since all of the chemical films of Comparative Examples 1 to 10 had compositions (content ratio) which are not within the range of the present invention (Zn/Mo/Al=4.0 to 5.5/3.0 to 5.0/0.5 to 1.5), they were inferior in adhesiveness in any one of Initial Adhesiveness, Adhesiveness After Heating, Adhesiveness After Spraying Salt Water and Transformability.

What is claimed is:

1. A method of producing a rubber part having an aluminum-based metal component and a rubber component, said aluminum-based metal component being made of aluminum or an aluminum alloy, the method comprising steps of:
   forming a chemical film A on a surface of the metal component by bringing a treatment agent into contact with the surface; and
   integrating the metal component and the rubber component through the chemical film A,
   the chemical film (A) comprising zinc fluoride, molybdenum and aluminum fluoride, wherein zinc of the zinc fluoride, the molybdenum and aluminum of the aluminum fluoride are present in the chemical film in a content ratio of zinc/molybdenum/aluminum=4.0 to 5.5/3.0 to 5.0/ 0.5 to 1.5 on a mass basis,
   the treatment agent comprising: (a) zinc sulfate aqueous solution containing 13 to 17% by weight of zinc sulfate heptahydrate; (b) ammonium fluoride aqueous solution containing 8 to 12% by weight of ammonium fluoride; and (c) sodium molybdate aqueous solution containing 3 to 7% by weight of sodium molybdate dihydrate, which are mixed in a mass ratio of (a)/(b)/(c)=5.25 to 8.75/2.25 to 3.75/1.50 to 2.50, the treatment agent containing 4.55 to 17.85 g/liter of zinc sulfate heptahydrate, 1.2 to 5.4 g/liter of ammonium fluoride and 0.3 to 2.1 g/liter of sodium molybdate dihydrate.

2. The method as set forth in claim 1, wherein the metal component has a cylindrical shape, and the method further comprises a step of reducing a diameter of the cylindrical metal component after forming the chemical film A on the surface of the cylindrical metal component.

3. The method as set forth in claim 1, wherein the treatment agent has a temperature of 50 to 60° C. and the surface of the aluminum-based metal component is kept in contact with the treatment agent for a period of 1 to 10 minutes.

4. The method as set forth in claim 3, wherein the metal component has a cylindrical shape, and the method further comprises a step of reducing a diameter of the cylindrical metal component after forming the chemical film A on the surface of the cylindrical metal component.

* * * * *